March 18, 1930.  R. D. PIKE  1,751,099
PROCESS OF MAKING ELECTROLYTIC IRON FROM SCRAP
Filed July 20, 1926
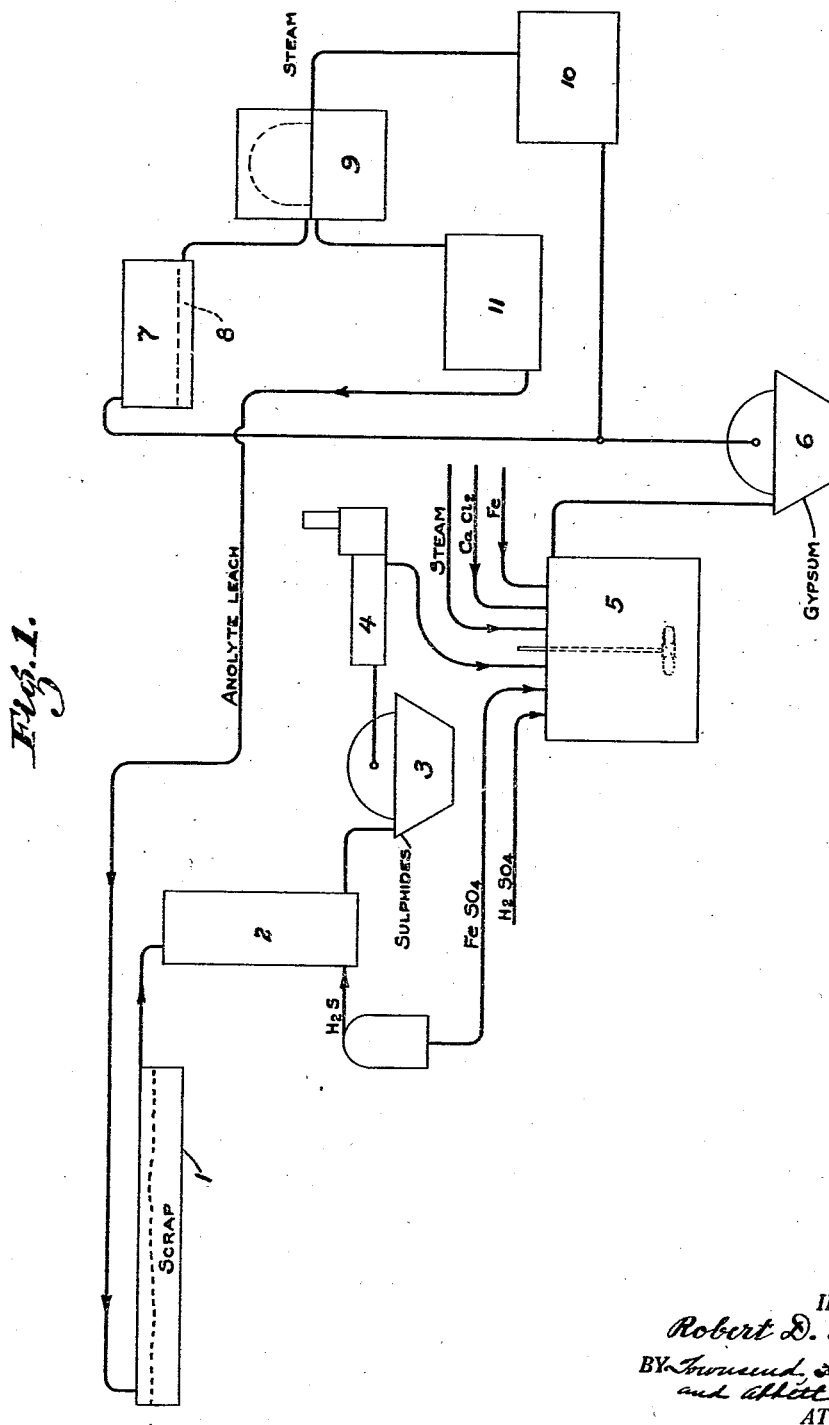
INVENTOR.
Robert D. Pike.
BY Townsend Loftus
and Abbott
ATTORNEYS.

Patented Mar. 18, 1930

1,751,099

UNITED STATES PATENT OFFICE

ROBERT D. PIKE, OF PIEDMONT, CALIFORNIA

PROCESS OF MAKING ELECTROLYTIC IRON FROM SCRAP

Application filed July 20, 1926. Serial No. 123,625.

My present invention relates to a process for manufacturing very pure electrolytic iron from scrap. In the open hearth process for manufacture of steel a considerable amount of iron and steel scrap is re-melted in the open hearth furnace. In the entire present process, from ore to finished steel, no metallurgical means exists for eliminating copper, nickel, and other metals relatively "noble" as compared with iron. Small amounts of these elements are continually introduced in the ore and are partially returned to the process in the scrap, and because they are not eliminated, are continuing to accumulate in open hearth steel. From year to year the average content of such elements in the open hearth steel which is manufactured is bound to increase, and the time is approaching when such accumulation will have to be dealt with by manufacturers, particularly in relation to certain special steels. Furthermore, it is not practical in the open hearth furnace to reduce either carbon or sulphur much, if any, below .02%. It therefore becomes of industrial importance to purify the scrap iron used in the manufacture of open hearth steel. This I accomplish by electrolytic treatment of the scrap. Regardless of the purity of the scrap dealt with, I can make, by my present invention, electrolytic iron of the following analysis:

Carbon_____ .006% or less
Sulphur_____ .007% or less
Copper_____ .006% or less phosphorus, silicon, manganese, nickel, cobalt, cadmium, zinc, tin, lead, and arsenic absent.

My preferred method of procedure is shown in the accompanying drawing, Figure 1. Considerable variation in the detail of this procedure is possible without departing from the spirit of my invention. Scrap iron or steel is placed in the launder 1, which is preferably made of Portland cement concrete impregnated with sulphur. Anolyte leach containing about 10% total iron and 4% to 5% $Fe^{+++}$ is introduced at one end and flowing through the launder dissolves iron and becomes reduced to a solution of ferrous chloride containing approximately a total of 12% iron and less than .2% $Fe^{+++}$. This reduced solution then flows to a gas treating tower 2, where it is treated with $H_2S$ gas for the precipitation of traces of copper and other impurities which form insoluble sulphides. These are filtered out in filter 3, the filtrate passing to evaporator 4, where it is evaporated to a specific gravity of 1.3 when hot, and then goes to treating and correcting tank 5, which is furnished with a propeller for agitation. Steam is added, if necessary, to maintain a temperature of about 80° centigrade, and an accurate copper determination made. If any trace of copper remains in the liquor this is precipitated by sponge iron, sufficient $H_2SO_4$ having been previously added to bring the pH to 2.5. Into the evaporator 4 is now added the ferrous sulphate which was produced incidental to the manufacture of $H_2S$ from ferrous sulphide and sulphuric acid. The chlorine losses per cycle will usually be not in excess of .1 pound chlorine per pound of electrolytic iron, and this amount of chlorine is added in the form of $CaCl_2$ into the tank 5. It is necessary to provide sufficient $SO_4$ ions to precipitate the calcium of the calcium chloride as gypsum, and this will usually be greater in amount than that provided from the $H_2S$ generator. The additional requirements can be made up by adding more ferrous sulphate or by adding sulphuric acid and iron. If the latter course is pursued care should be exercised to see that the pH of the liquor leaving the tank 5 is substantially 2.5. The concentration of $SO_4$ in the effluent should be about .2%. The effluent is filtered in 6, the filtrate passing directly to the electrolyte supply tank 7, which is provided with a filter bottom 8. The voluminous precipitate of gypsum cleanses the electrolyte of colloidal impurities containing carbon and sulphur. Electrolyte flows to the electrolytic iron cells 9, of the type described in my pending application, Serial Number 58,009. Surplus catholyte drains into tank 10 and is returned to tank 7. Anolyte flows into tank 11 and is returned to launder 1.

Having thus described my invention, what

I claim as new and desire to secure by Letters Patent is:

A cyclic process for producing electrolytic iron from scrap, which consists in dissolving the scrap in a leach containing ferric chloride, purifying the reduced liquor by precipitation of metallic impurities as sulphides, adding $CaCl_2$ to restore chlorine losses to the cycle, and adding sufficient sulphate ion to precipitate the calcium of the said calcium chloride as gypsum, filtering off the gypsum, electrolyzing the solution for production of pure electrolytic iron and regeneration of the leach.

ROBERT D. PIKE.